United States Patent
Bean

[11] Patent Number: 6,050,222
[45] Date of Patent: Apr. 18, 2000

[54] PORTABLE FEED CARRIER

[76] Inventor: Beverly Bean, 8825 159th Ct. N., Palm Beach Gardens, Fla. 33418

[21] Appl. No.: 09/018,239

[22] Filed: Feb. 3, 1998

[51] Int. Cl.[7] ..................................................... A01K 5/01
[52] U.S. Cl. .................................................................. 119/65
[58] Field of Search ................................. 119/65, 66, 67, 119/68, 69; 150/107, 109; 383/7, 8, 9, 123, 124, 125

[56] References Cited

U.S. PATENT DOCUMENTS

| | | |
|---|---|---|
| 234,593 | 11/1880 | Lowerre . |
| D. 287,771 | 1/1987 | Kimble ..................... D30/13 |
| D. 341,448 | 11/1993 | Herzenach ............... D30/121 |
| 484,278 | 10/1892 | Zeip . |
| 927,073 | 7/1909 | Rayburn . |
| 1,508,964 | 9/1924 | Doutney . |
| 1,699,942 | 1/1929 | Appelbaum . |
| 2,364,886 | 12/1944 | Wolf ............................. 229/54 |
| 4,159,142 | 6/1979 | Larson ...................... 296/24 C |
| 4,822,177 | 4/1989 | Arend ............................. 383/4 |
| 4,976,222 | 12/1990 | Cooke ........................... 119/60 |
| 5,000,122 | 3/1991 | Smith ............................ 119/58 |
| 5,036,799 | 8/1991 | Jordan et al. ................. 119/61 |
| 5,188,060 | 2/1993 | Johnson ........................ 119/58 |
| 5,192,133 | 3/1993 | Juel et al. ....................... 383/7 |
| 5,255,833 | 10/1993 | McAllister ................... 224/202 |
| 5,375,559 | 12/1994 | Baadsgaard .................. 119/58 |
| 5,490,478 | 2/1996 | Cole ........................... 119/28.5 |
| 5,577,730 | 11/1996 | Vannozzi, Sr. ............... 273/260 |
| 5,669,525 | 9/1997 | Sapyta ......................... 220/9.1 |

Primary Examiner—Peter M. Poon
Assistant Examiner—Yvonne R. Abbott
Attorney, Agent, or Firm—John C. Smith

[57] ABSTRACT

A portable feed carrier with a central feed chamber for roughage and an integral hanger attachment for attaching a pail for holding grain. The central feed chamber is formed by a flexible panel. The hanger attachment detachably attaches to a feed pail. The hanger attachment uses the weight of the pail to secure the central feed chamber in the closed position such that the roughage is not visible to the livestock. Shoulder straps are attached to the proximal and distal ends to allow a user to carry the device hands-free. Removable support rods are inserted into sleeves at the proximal and distal ends of the carrier to hold the ends of the flexible panel in alignment, and retain the shape of the carrier. The hanger strap can optionally go over or through the flexible panel, and be attached to the flexible panel, the support rods, or the shoulder strap. Optionally, a single shoulder strap can be used in place of the dual straps. The shoulder straps can be permanently attached or detachable. Optional side seals or other fastener means can be used to completely enclose the central feed chamber.

13 Claims, 18 Drawing Sheets

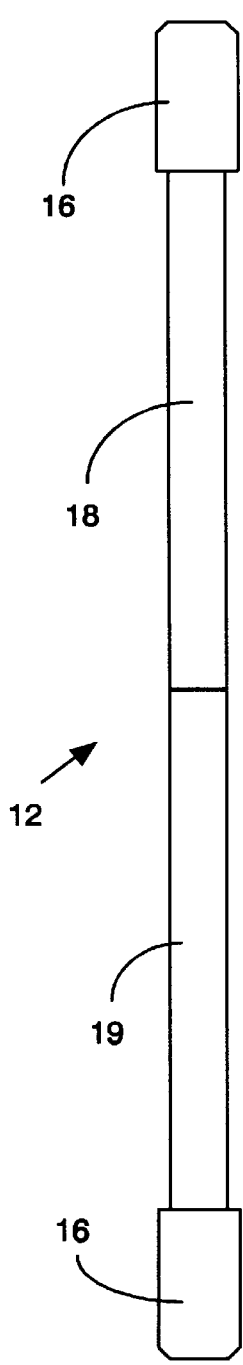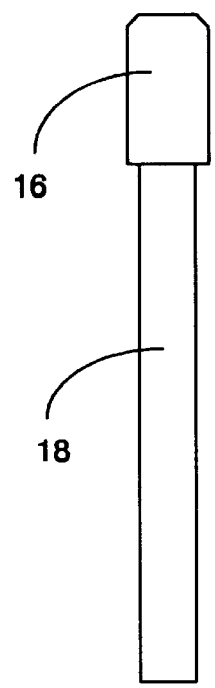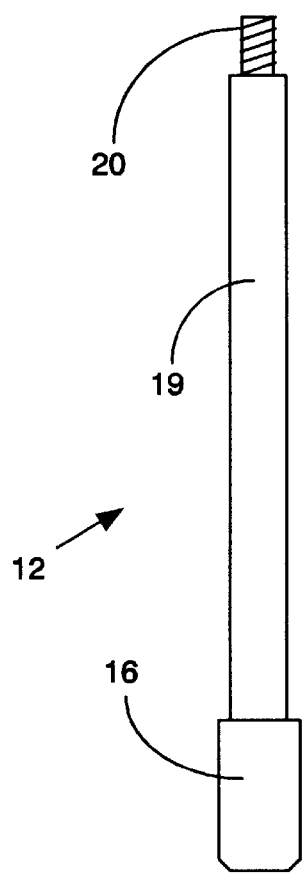
Figure 5B
Figure 5A

PORTABLE FEED CARRIER

BACKGROUND OF THE INVENTION

The present invention relates to carrying devices for live stock feed. In particular, it relates to portable feeding devices and methods which provide for single or simultaneous transportation of multiple feed types. Further, the device conceals the feed from the livestock while the user is leading the livestock, (for example, a horse) to pasture. The invention further relates to feed carriers which can be disassembled and folded for shipment or storage, and also to feed carriers which allow easy access to the interior for ease of loading, unloading and cleaning.

BACKGROUND ART

The care of animals and livestock, and in particular the care of horses, requires a substantial amount of effort and time. While the invention is suitable for use with any type of livestock or animal which consumes both roughage and grain, it's primary use is intended to be with horses. However, for ease of discussion, the terms horses, animals and livestock may be used interchangeably herein. Horses require large amounts of feed which typically include both a) roughage, such as hay, and b) grain. The term "grain" as used herein includes grain and/or processed or natural grain by-products, such as oats, sweet grain mix with molasses, and/or plant protein products. In addition, it includes other supplements, such as medications and/or additives which may be mixed with the grain product.

While roughage is dry, grain may come in a variety of forms. It may be salty, pasty, granular, moist or sticky depending on its ingredients. A difficulty associated with these feeds is that the roughage is usually kept separate from the grain which further increases the work required to properly care for the horse. In addition, since both roughage and grain are simultaneously brought to the horse twice a day for feeding, the need to keep them separate increases the amount of work and consumes time.

The prior art has provided a number of fixed feed station designs for use with livestock. Typically, the feed stations are substantial in size and placed in permanent locations. The drawback to a fixed feed station is that livestock is moved for a variety of reasons. For example, horses are moved over large distances for regional competitions and other events. In response to this problem, portable feed stations have been developed which can be transported with the livestock. These portable feed stations, typically attach to the side of a permanent object such as vehicle, fence or stall facility, and are used to "serve" the feed to the horse. However, since the fixed feed station device is not used to transport the feed, the user must still make multiple, time consuming trips to feed the horse. First, the user must move the animal to the desired location or feeding area such as moving the horse from a trailer to a stall facility or containment area such as a portable corral or tether line if camping. After moving the horse, the user must then return to obtain and bring the feed to the desired location or fixed feed station. Depending on the amount of feed required, the user may have to make separate trips for roughage and grain. It would be desirable to have a portable feed carrying device capable of eliminating the multiple trips discussed above by allowing the user to transport roughage and grain at the same time the user is leading the horse to the desired location or feed station.

Portable horse feeders have also been developed which take the form of a large open hay trough or unfold into a portable corral capable of restraining the horse. As was the case with the feed stations discussed above, these devices are intended to serve the feed rather than transport it. In addition, the large size and heavy weight of these devices make them difficult to move and unsuitable for carrying feed. It would be desirable to have a carrying device for feed which is light enough to be hand carried when filled with feed, and also capable of being carried at the same time the user is leading the horse.

A horse may need to have feed brought to a fixed feed station or brought to a distant location which requires the provision of feed for the horse. For example, a horse may be turned out in a pasture which does not have grass with sufficient quality to sustain proper health requirements. The horse may be stalled in a large barn in which the feed storage area is located several stalls away, at the end of a long isle, or in another building. The horse may also be taken on trips. When traveling with a horse, the user will have to twice daily carry feed to the horse from a vehicle, a tent site or a storage area. The prior art does not provide a convenient way to carry roughage to a horse. s Typically, a person carries roughage or hay in the their arms and/or by using both hands. It is inconvenient and undesirable to carry roughage in this manner due to its bulk, size and loose texture. Further, a person who carries roughage in this manner becomes covered in hay debris and may have to change clothing if leaving the barn to go to work, etc. This method of carrying hay also prevents the simultaneous performance of other activities, such as leading the horse, carrying grain, opening or closing gates or stall doors, and/or bringing a water hose or any other horse care related item to the destination at the same time. It would be desirable to have a portable feed carrying device that would protect clothing while simultaneously allowing the user to perform other activities, such as carrying grain, leading the horse, or opening and closing gates and stalls, thereby reducing the time required to care for the horse.

Another disadvantage associated with known methods of carrying feed is that they do not conceal the feed from the horse until the desired feeding time. As a result, when the horse sees the feed, the horse is distracted and immediately attempts to eat which interferes with the user who is attempting to lead the horse and carry feed at the same time. This can be exceedingly disruptive and results in the user opting to make multiple trips so that the feed would not be carried at the same time the horse was being led. It would be desirable to have a "hands-free" carrying device for feed which can be carried by the user while leading the horse and also can conceal the feed from the horse until such time as the user wants the horse to be fed.

There are known feed carrying devices that use closed structures which make them difficult to load, unload and/or clean. In addition, they may have seams in areas where feed gathers which can retain feed debris, which in turn leads to potential contamination and health risks. Also, known carrying devices for feed do not allow separation of roughage from grain. As a result, grain, which may be moist, sticky, etc., may intermingle with the hay and/or adhere to the interior of the carrying device such that it becomes difficult to clean, attracts insects, bacteria and/or mold. Further, roughage and grain are typically fed separately to livestock such as horses even though they are generally provided simultaneously at each feeding. It would be desirable to have a carrying device for feed that offers separate compartments for simultaneous carrying of roughage and grain, that allows the grain area to be easily rinsed, that can be easily opened to allow a thorough cleaning of the roughage area, and that is seamless to avoid gathering of debris.

Prior art devices use rigid structures which do not allow folding or disassembling for shipment or storage. It would be desirable to have a carrying device for feed which can be compactly folded.

The prior art has failed to provide a livestock feed carrying device which is inexpensive to manufacture, can conceal the feed from the horse, can separately and simultaneously transport roughage and grain, can be folded for shipping or storage, is seamless to facilitate cleaning, can be opened easily and fully for cleaning, loading and unloading, and which allows hands-free transport of feed allowing the user to lead the horse while carrying feed. The prior art has further failed to provide devices which are centrally balanced and easy to carry, flexible on the edges for safety, and offer garment protection from debris while carrying feed.

SUMMARY OF THE INVENTION

The present invention solves the foregoing problems by providing a portable feed carrier which has a central feed chamber for roughage and an integral hanger attachment for attaching a pail for holding grain. The central feed chamber is formed by a flexible panel. The hanger attachment detachably attaches to a feed pail. In addition, the hanger attachment preferably uses the weight of the pail to secure the central feed chamber in the closed position such that the roughage is not visible to the livestock, but optionally the central feed chamber can be closed by other means. Shoulder straps are attached to the proximal and distal ends to allow a user to carry the device hands free. Removable support rods are inserted into sleeves at the proximal and distal ends of the carrier to hold the ends of the flexible panel in alignment. Optionally a single shoulder strap can be used in place of the dual straps. Optional side seals can be used to completely enclose the central feed chamber. The removable rods may optionally be made from several rigid sections to allow the rods to be folded for shipment or storage.

BRIEF DESCRPITION OF THE DRAWINGS

FIGS. 5A–5B is another alternative embodiment of the support rods which may be separated into two rigid sections for transport or storage.

DESCRIPTION OF THE PREFERRED EMBODIMENT

Figure 1:
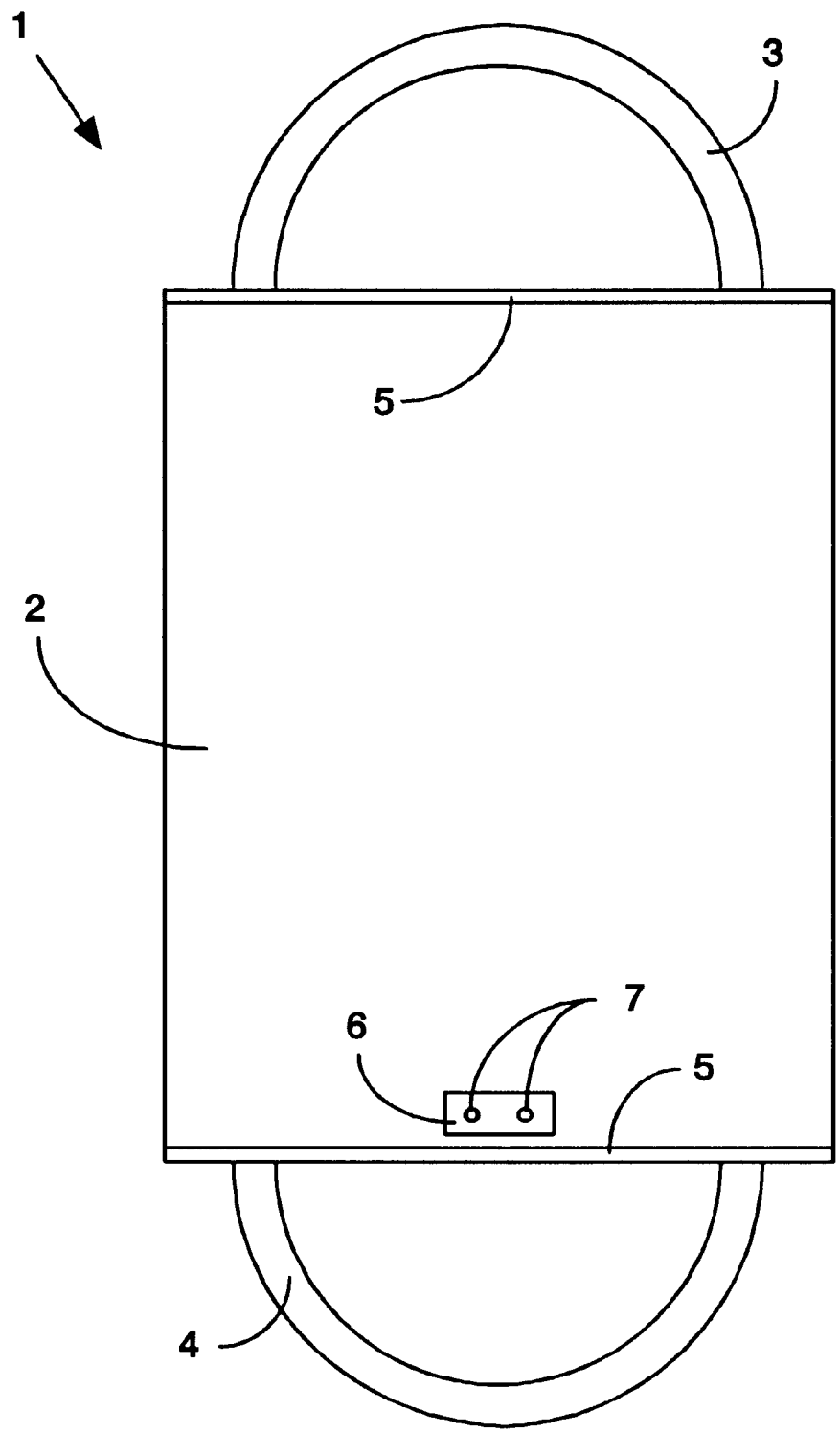
FIG. 1 is a preferred embodiment showing the outside surface of the portable feed carrier.

Prior to a discussion of the figures, a general discussion of the features and advantages of the invention follows. The portable feed carrier provided herein has separate compartments for holding grain and roughage such that one will not contaminate or interfere with the other. It is formed from a flexible central panel that is folded over to form a central compartment for storing roughage. When folded over, a strap is used to hold a pail containing grain. Further, the weight of the pail pulls the strap such that it automatically closes the flexible panel ends and conceals the roughage. In addition, the device has straps that allow the user to suspend the device from the user's shoulder resulting in hands-free carrying.

As was discussed above, the prior art method of feeding horses requires several trips: first to move the horse, then to bring the roughage, and again to bring the grain. The feed carrier shown herein allows both types of feed to be simultaneously carried to the horse's location and unloaded for consumption by the horse. Because the user can transport the feed carrying device hands-free, the user can lead the horse at the same time the feed is being transported, as well as performing other tasks such as opening and closing gates and stalls. The ability to use the device in a hands-free manner is facilitated by centrally balancing the feed carrier such that it is stable when mounted on the user's shoulder.

In addition to saving time by allowing the user to feed a horse with a single trip to the feeding location, the device also reduces the possibility of injury to the horse. This is accomplished by concealing the feed, both roughage and grain, from the horses view while the horse is being led. By concealing the feed from the horse's view, the horse is not tempted to move its head toward the feed carrier and perhaps injure an eye by inadvertently striking the carrier. In addition, rigid elements of the feed carrier, such as support rods used to hold the ends of the panel that forms the feed carrier in place, are sized to fit within sleeves to further reduce the possibility of injury to the horse.

An additional advantage of the invention is that it can be disassembled and folded for shipment or storage. For example, a preferred embodiment of the invention uses a soft flexible panel that can be folded or rolled when not in use. In addition, the support rods which hold the shape of the portable feed carrier can be removed and themselves optionally separated into smaller segments. This allows the portable feed carrier to be large enough to fit within a small grain carrying pail when not assembled, and large enough to hold the correct amount of feed for a horse when it is assembled, and also to allow easy access to the interior for ease of loading, unloading and cleaning.

Another advantage of the invention is that it reduces the contact between the user and the feed. This greatly reduces the amount of debris which would normally come in contact with user's clothing. If a horse is fed twice a day, then the user may have to change clothing such that four outfits a day are necessary. By eliminating this inconvenience, the portable feed carrier greatly reduces the time and expense associated with garments used by the person taking care of the horse.

The simple structure of the device also makes it easy and inexpensive to manufacture. As a result, a user may have several of the devices without incurring unreasonable expense.

The portable feed carrier uses a flexible panel which does not have any seams. The seamless structure provides several advantages. The absence of seams eliminates crevices that would otherwise catch debris which can become contaminated or carry mold, bacteria, etc. The single flexible panel is also easy to clean since it can be laid flat in an open position and easily rinsed or brushed out. The seamless structure also makes it easy to load and unload since it can be fully opened for easy access to the roughage.

The straps allow the device to be hung in a convenient location and preloaded with roughage and grain. This allows a user to pre-measure the correct amount of feed at the user's convenience. As a result of this and the other features discussed above, the portable feed carrier allows the user to more effectively manage time, to easily store the device in a disassembled state, to simultaneously transport roughage, grain, and the horse to a feeding location in a single trip, and to protect the user's garments. Advantages heretofore not available in the prior art.

Referring to FIG. 1, this figure shows the outer surface of a preferred embodiment of a portable feed carrier 1. The portable feed carrier 1 is comprised of a flexible panel 2. Sleeves 5 are integrally formed at either end of the flexible panel 2. The sleeves will be discussed more fully below in regard to the use of support rods. A hanger strap guide 6 which is held in place by rivets 7, but may be secured by other means such as being sewn, etc. The hanger strap guide 6 is used to hold the integral hanger attachments 9, 11 (shown in FIG. 2). Also shown are carrying straps 3, 4. In the preferred method of use, both straps 3, 4 rest on the user's shoulder, but the end of the flexible panel 2 which is attached to carrying strap 3 is positioned in a proximal position to the user and the end of the flexible panel 2 which is attached to carrying strap 4 is positioned distally from the user. Likewise, the preferred embodiment uses permanently attached carrying straps 3, 4, but those skilled in the art will recognize that the carrying straps 3, 4 may also be detachable.

The flexible panel 2 can be made from any suitable material, such as cloth, plastic, polypropylene, polyethylene, etc. However, the grade and type of material used should be suitable for outdoor use and for use in areas where the exposure to water and dirt is expected. Material that can be easily rinsed or washed is preferred. Of course, the flexible panel 2 can also be made from more ornamental materials such as fabrics depending on the nature of the use (for example, horse shows, etc.). Some fabrics may be used for activities such as horse shows or stable use, where weather and the elements are not a factor. Therefore, for these applications, any type of fabric may used which suits a particular fashion or durability goal.

The size of flexible panel 2 can vary and is not critical so long as it is sufficiently large enough to hold a suitable amount of roughage without having the roughage fall out of the ends, and not so large that it is cumbersome for the user. However, a flexible panel 2 having a generally rectangular shape of approximately 3 feet in width and 4 feet in length has been found to hold an adequate amount of roughage when folded into the closed position (the closed position is approximately three feet wide and approximately two feet in length). Likewise, the weight, thickness and strength of flexible panel 2 can vary so long as it is suitable for carrying the feed necessary for the livestock.

Figure 2:
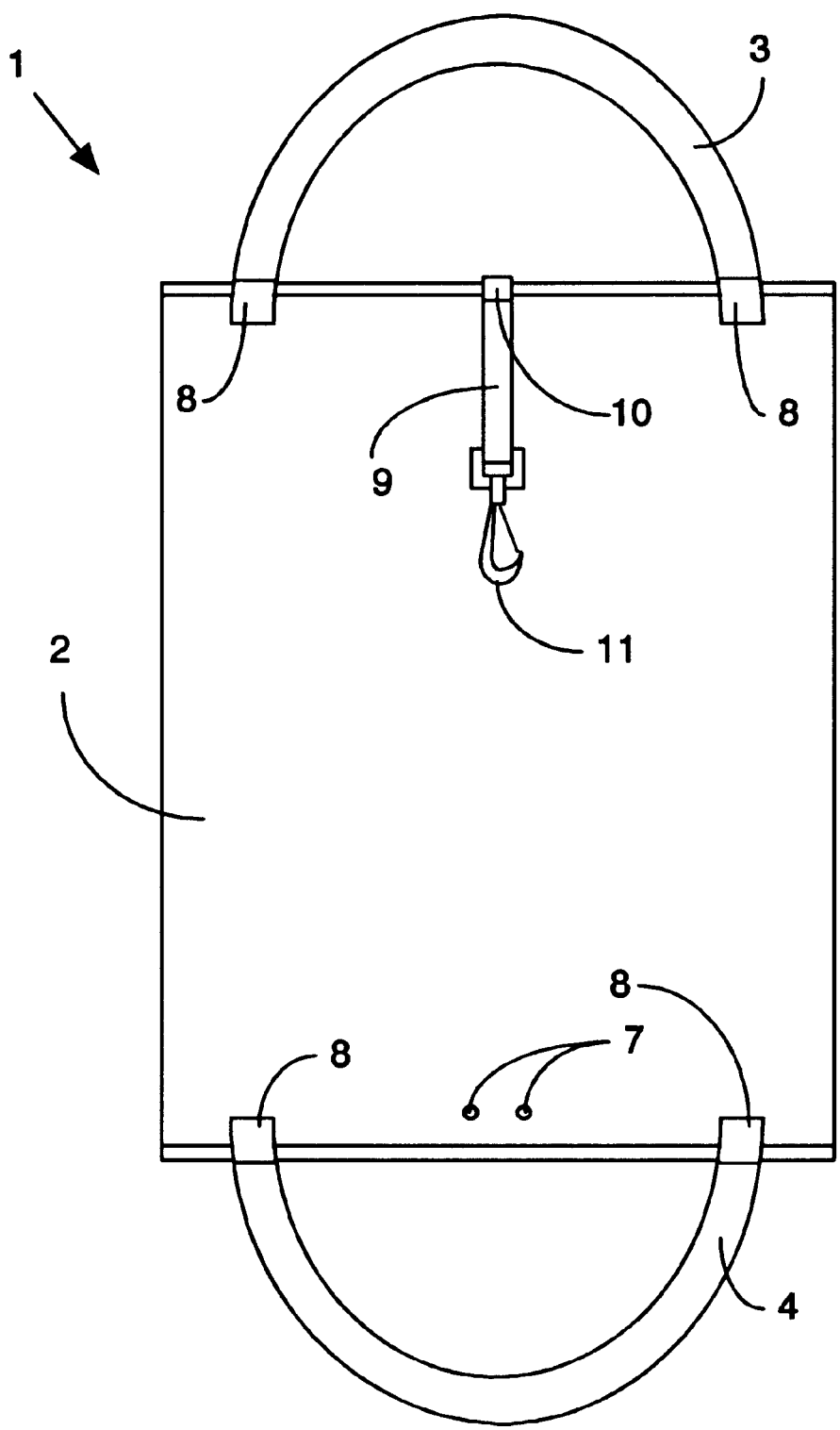
FIG. 2 is a preferred embodiment showing the inside surface of the portable feed carrier.

FIG. 2 shows the inside surface of a preferred embodiment of a portable feed carrier 1. The carrying straps 3, 4 are attached to the surface of flexible panel 2 at locations 8. Any suitable attachment method can be used and will vary depending on the materials used in the fabrication process. For example, if cloth is used to fabricate flexible panel 2, then carrying straps 3, 4 would typically be sewn on. Likewise, if plastic, polypropylene or polyethylene is used, then other attachment methods, such as attaching with adhesive or attaching via heat or RF sealing may be more convenient The material used to fabricate the carrying straps 3, 4 can be any suitable material and typically would be chosen based on its compatibility with the material selected to fabricate the flexible panel 2. The size of carrying straps 3, 4 is not critical but its size should be suitable to allow a user to hang the portable feed carrier 1 from the user's shoulder.

Also shown is integral hanger attachment 9, 11 which is attached to flexible panel 2 at location 10. Integral hanger attachment 9, 11 includes hanger strap 9 and fastener 11. Fastener 11 can be a simple clip or any other suitable fastening device. Any suitable method can be used to secure the integral hanger attachment 9, 11 to flexible panel 2.

Figure 3:
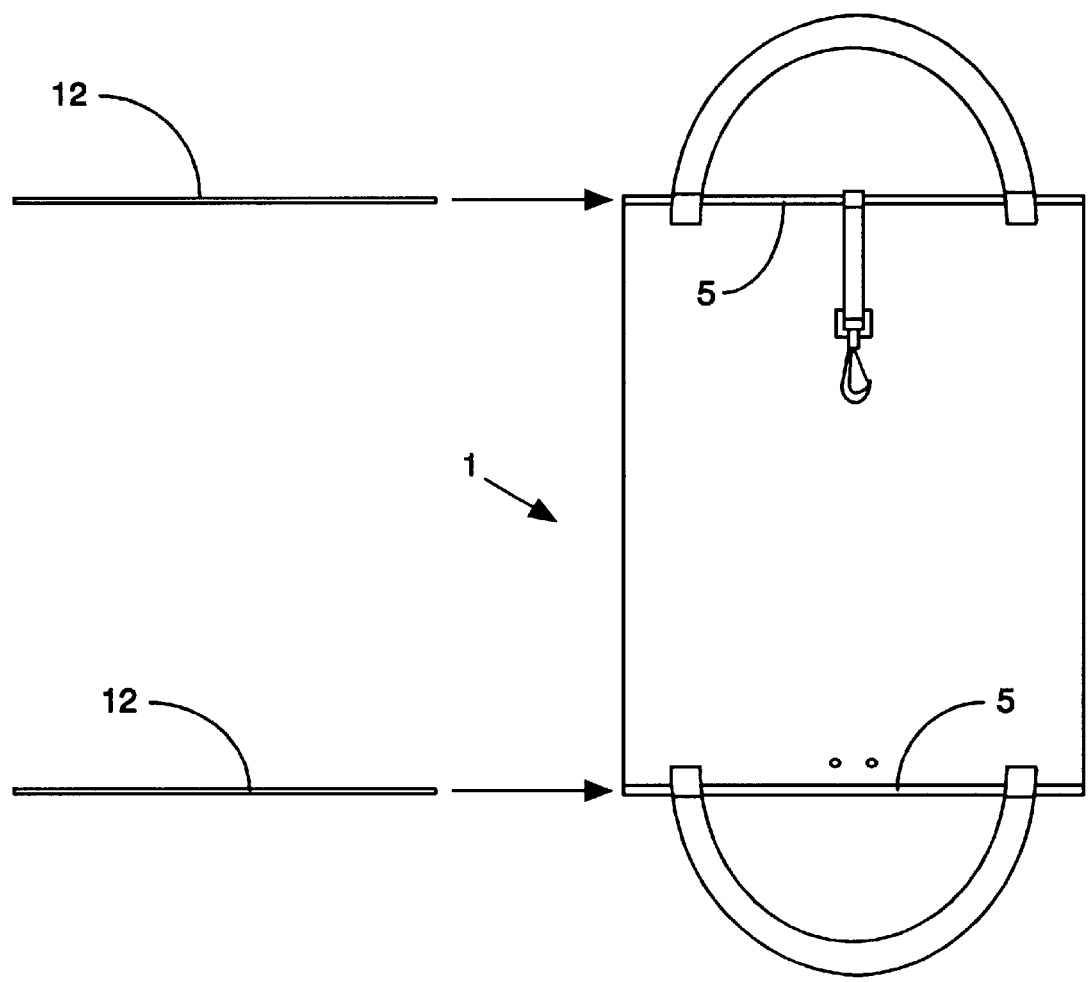
FIG. 3 is a preferred embodiment illustrating the support rods being placed inside the sleeves of the flexible panel of the portable feed carrier.

FIG. 3 shows portable feed carrier 1 with support rods 12 being inserted into sleeves 5 of flexible panel 2. It has been found that the use of support rods 12 increases the ability of portable feed carrier 1 to hold its shape and thereby enhances ease of use. Support rods 12 can be fabricated from any suitable material, including wood, metal plastic, fiberglass, etc. The support rods 12 should preferably be shorter in length than sleeves 5. The reason for this is that the support rods 12 will fit entirely within sleeves 5 if they are shorter, thereby allowing the ends to be flexible for safety and concealment reasons. Therefore, the soft ends of the sleeves 5 will act as protective cover and prevent a horse from accidentally striking an eye if the horse is next to the portable feed carrier 1 and moves its head suddenly into the device. In addition, the flexible panel 2 will fold easily at its edges because the support rods 12 are not holding them in place. This allows the edges of the flexible panel 2 to further conceal the roughage 22 from the horse 23 (shown in FIG. 7).

Figure 4A:
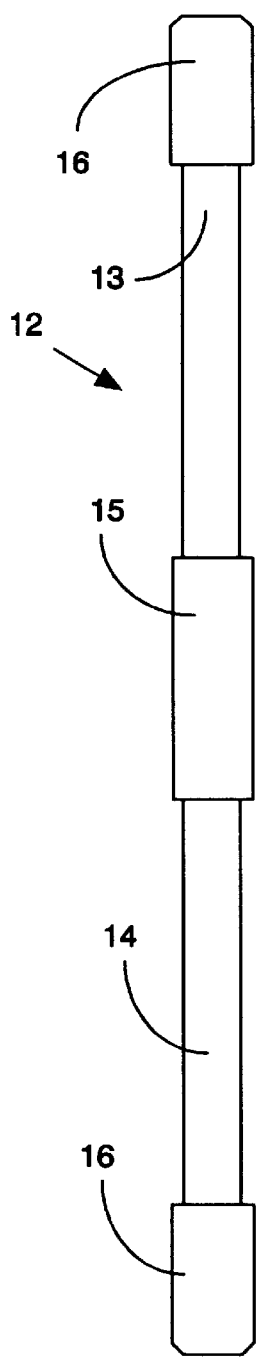
FIGS. 4A–4C is an alternative embodiment of the support rods which may be separated into two rigid sections for transport or storage.
Figure 4B:
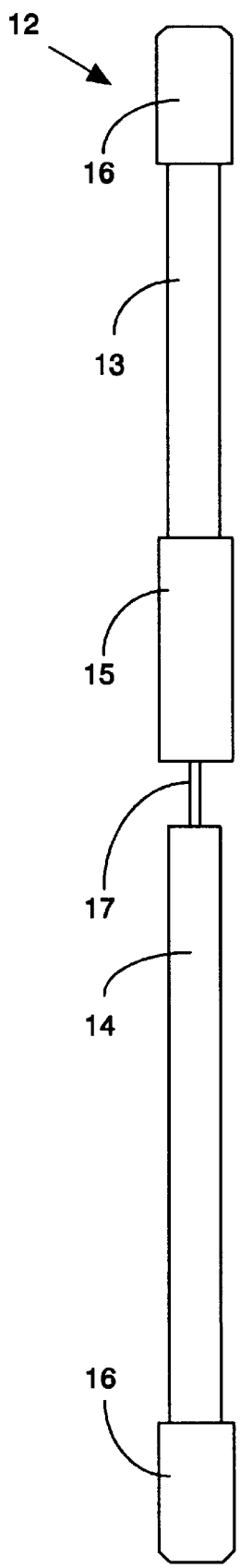
Figure 4C:
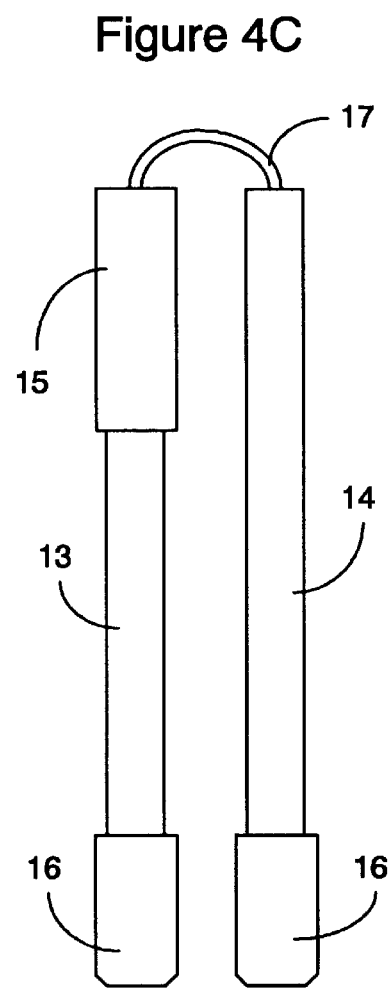

FIGS. 4A–4C show an alternative embodiment of support rod 12. In this embodiment, support rod 12 has two main segments 13, 14, a central sleeve 15, and optional protective end caps 16.

In FIG. 4A, the support rod 12 is shown in the assembled position. In this position, end caps 16 cover the blunt end of support rod 12 to improve safety. In the preferred embodiment, optional end caps 16 are made from a pliable material such as rubber or vinyl, but can be made from any other suitable material. Also, in this position the attachment sleeve 15 is used to secure the main segments 13, 14 together. Attachment sleeve 15 is envisioned as being permanently or removably attached to segments 13 and removably attached to the other segment 14 in the preferred embodiment, but may be removably attached to both segments 13, 14. Segments 13, 14 are attached to one another by elastic cord 17 (shown in FIG. 4B) which pulls the two segments 13, 14 together. When they are aligned along the same axis, they will be pulled by elastic cord 17 such that segment 14 slides into attachment sleeve 15 and is held in place under pressure.

In FIG. 4B the segments 13, 14 are pulled apart to reveal the elastic cord 17 which attaches the two segments 13, 14 to one another.

In FIG. 4C the segments 13, 14 are pulled apart and folded such that they can be stored in a smaller area. In the preferred embodiment, the segments 13, 14 are sized such that when they are folded as shown in FIG. 4C, they can be easily stored within a small size feed carrying pail, preferably eight quarts. In addition, if flexible panel 2 is made from a foldable material such as cloth, the entire portable feed carrier 1 can be folded and stored within the small feed carrying pail 21 (shown in FIG. 6). This provides not only convenience when storing the portable feed carrier 1, but it also allows the portable feed carrier 1 to be stored and shipped in a package that is sized to fit a small (i.e., 8 quart) feed carrying pail 21. An advantage of this embodiment is that it allows the support rod 12 to be quickly disassembled by the user.

FIGS. 5A–5B illustrate an alternative embodiment of the support rod 12 which uses a threaded two piece shaft. This embodiment of the support rod 12 has a first segment 18 and a second segment 19. FIG. 5A illustrates the support rod 12 in the assembled configuration. FIG. 5B illustrates the support rod 12 in the disassembled configuration. Segment 19 is shown with threads at one end for insertion into segment 18. This embodiment also uses optional end caps 16 for safety reasons. As was the case above, the ability to separate the support rod 12 into shorter segments 18, 19 provides reduced space requirements for both shipping and storage. An advantage of this embodiment is that it allows the support rod 12 to be fabricated from the minimum number of parts. Those skilled in the art will recognize that double sided screws can be used to thread into both segments 18, 19 or support rod 12, allowing the support rod 12 to be assembled with two or more segments.

Figure 6:
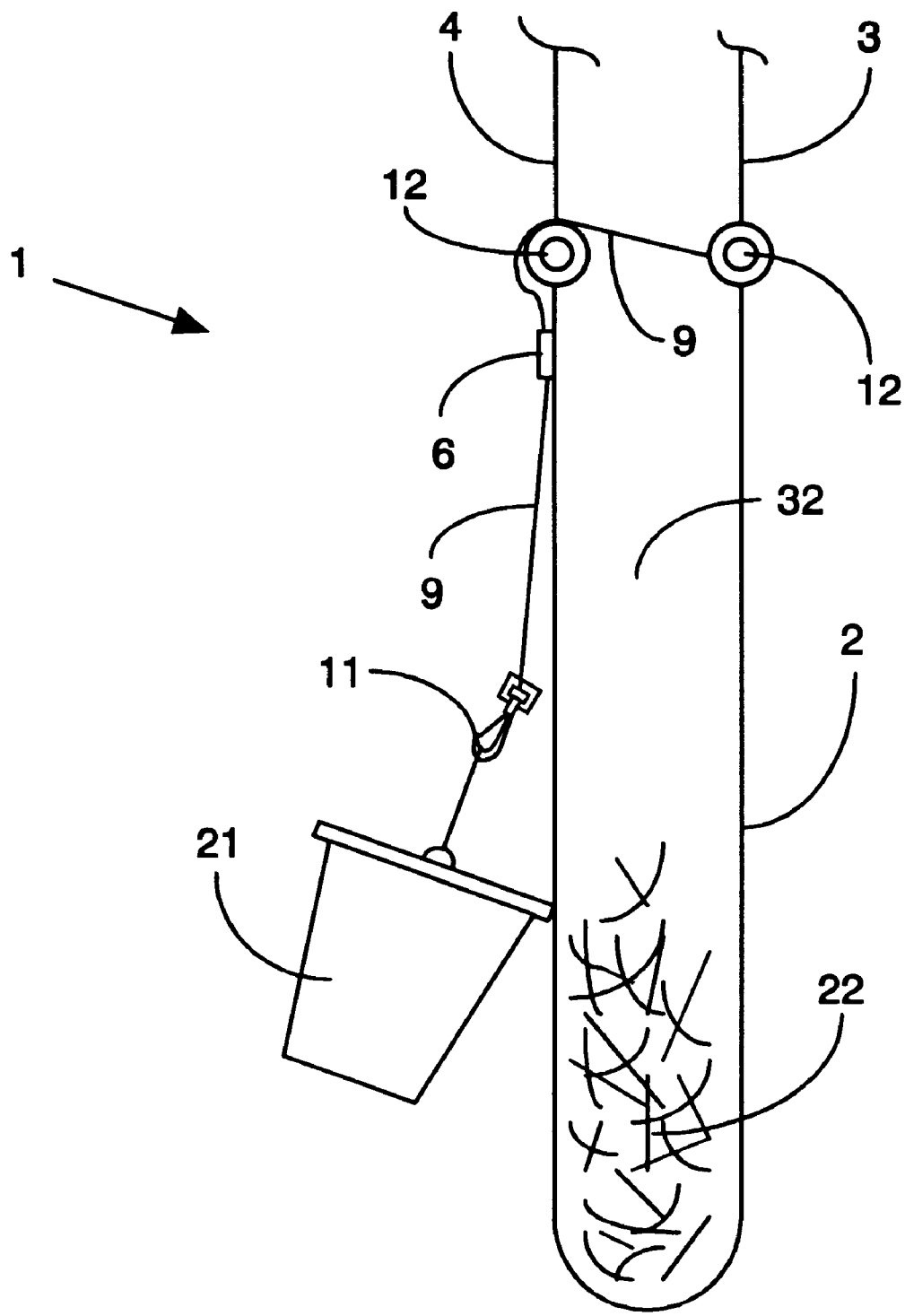
FIG. 6 is a side end view of the portable feed carrier which shows roughage in the central feed chamber and a pail containing grain attached to the integral hanger attachment. The integral hanger attachment uses the weight of the pail to hold the portable feed carrier in a partially closed position.

FIG. 6 is a side view of a preferred embodiment in which integral hanger attachment 9, 11 is routed over the distal end of the flexible panel 2 and through the hanger strap guide 6. A pail 21 holding grain is attached to fastener 11. An advantage associated with this configuration is that the weight of the pail 21 acts to force the distal and proximal ends of the flexible panel 2 together, thereby securing the top of portable feed carrier 1 in the closed position. Roughage 22 is also illustrated in the central feed chamber 32.

For ease of illustration, in this and the following figures, the proximal and distal ends of flexible panel 2 are shown slightly separated in a "partially closed" position to better show the position and path of the various components of the portable feed carrier. However, in actual use, the proximal and distal ends of flexible panel 2 will be in the closed position in which they are in close proximity with each other (as shown below in regard to in FIG. 7). Likewise, while the roughage 22 in the central feed chamber 32 is clearly visible in the figures for illustrative purposes, the edges of portable feed carrier 1 fold to conceal the contents of central feed chamber 32 in actual use.

Figure 7:
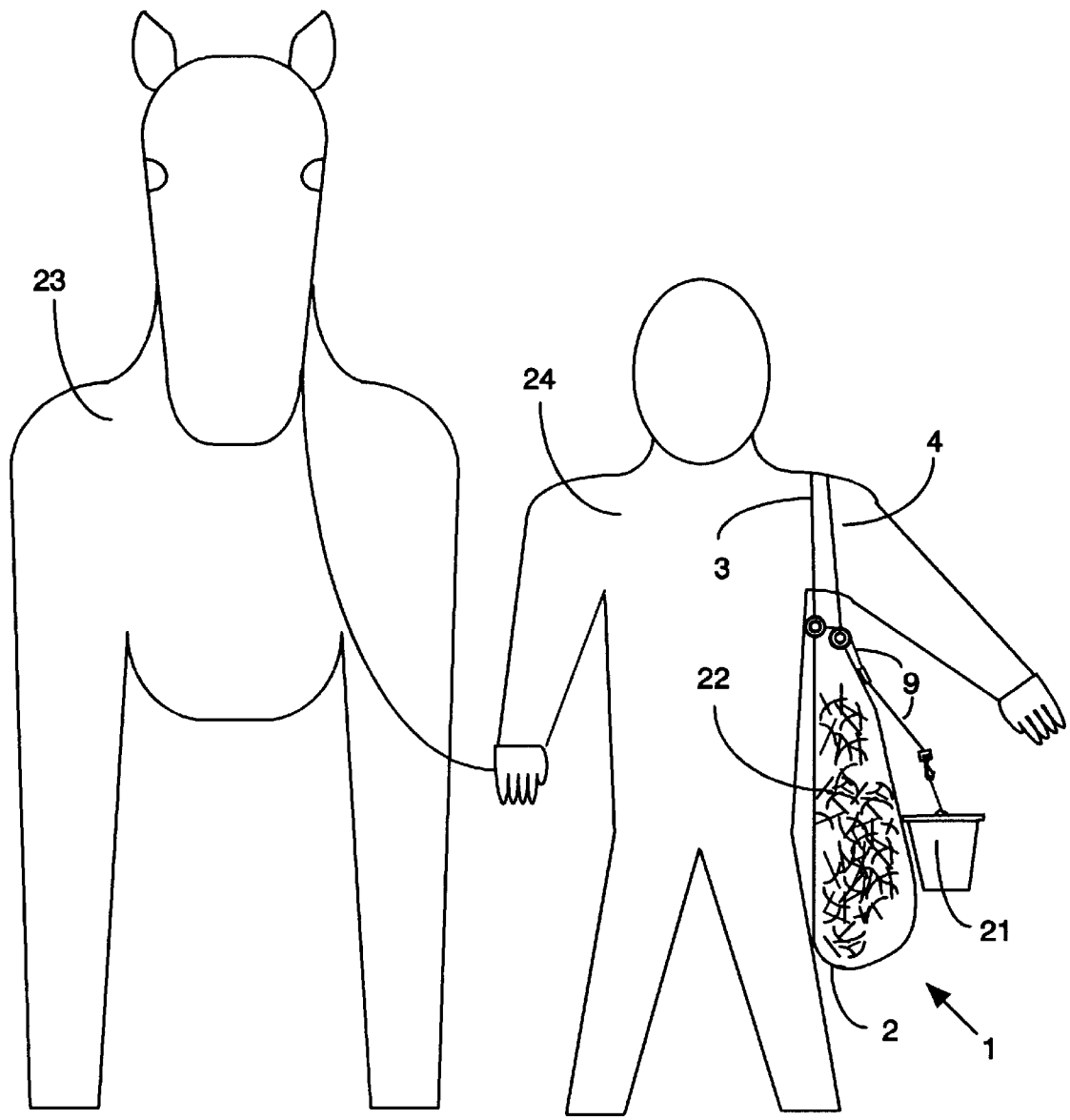
FIG. 7 illustrates the portable feed carrier in a closed position being carried by a user while a horse is being led.

FIG. 7 illustrates the manner in which the portable feed carrier 1 is used. A user 24 holds the portable feed carrier 1 by suspending it via carrying straps 3, 4. This frees both hands and permits the horse 23 to be led at the same time the feed is carried. The roughage is concealed from the horses view and thereby avoids the situation where the horse becomes unruly by attempting to eat the feed. In addition, the pail 21 containing grain is concealed from the horse's view by the portable feed carrier 1. This view shows the portable feed carrier 1 in the closed position, wherein the hanger strap and pail 21 combine to hold the proximal and distal ends of the portable feed carrier 1 together.

Figure 8:
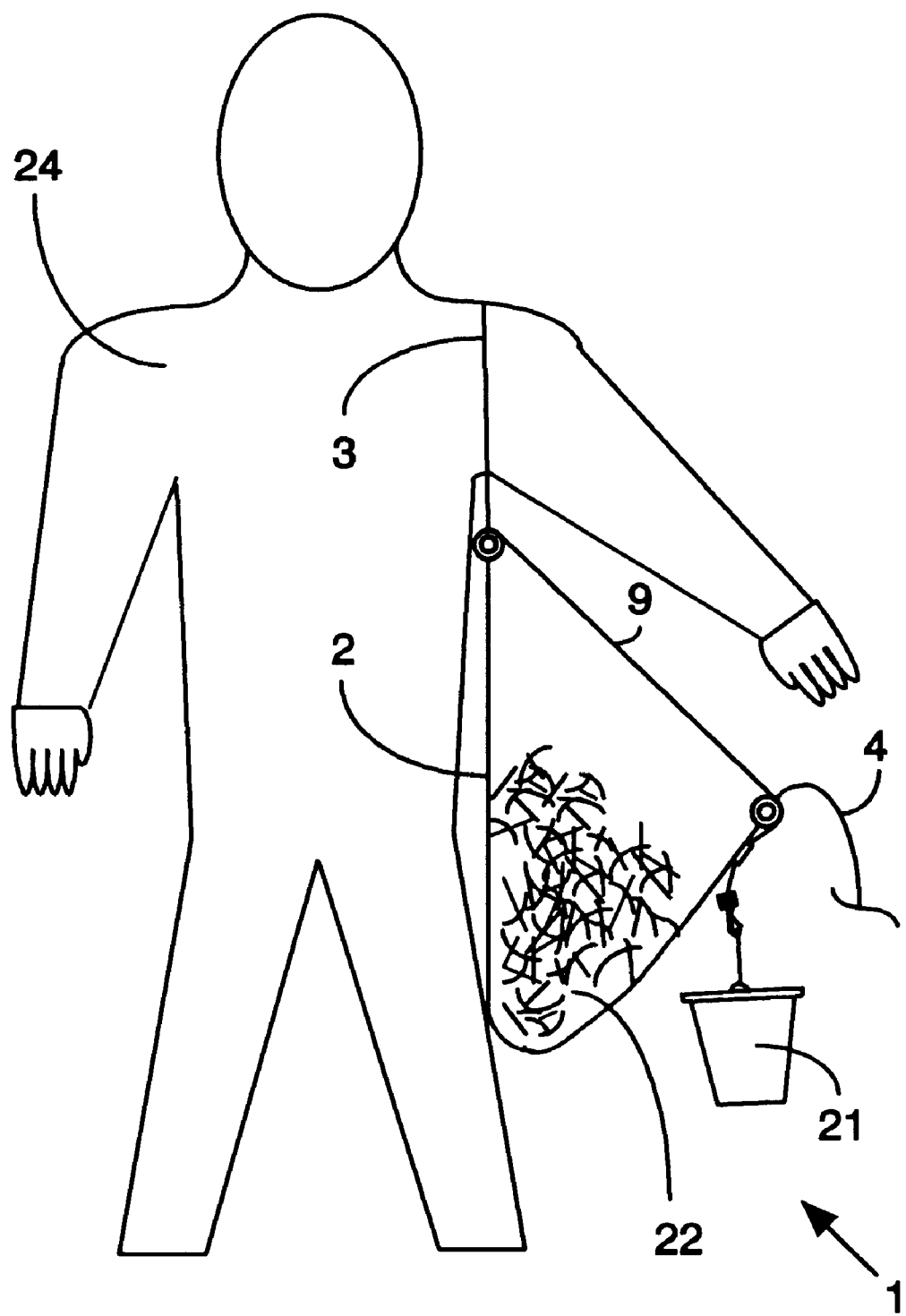
FIG. 8 illustrates the portable feed carrier in the semi-open position during unloading of the roughage from the central feed chamber.

FIG. 8 shows how the roughage may be unloaded from the portable feed carrier 1. The user 24 pulls the flexible panel 2 to a semi-open position so that the roughage 22 can be easily unloaded. The pail 21 is preferably attached to the portable feed carrier 1 during the removal of the roughage 22 because it acts as a stop to prevent the flexible panel 2 from completely opening and dropping the roughage 22. In this figure, carrying strap 4 is hanging off of the user's 24 shoulder. It is not necessary for the user 24 to hold the portable feed carrier 1 in the open position because the pail 21 performs this function automatically. This is because the pail 21 and hanger strap guide 6 act to hold the distal end of the flexible panel 2 in the partially open position when they are in contact. As a result, the user 24 is free to use both hands to load or unload roughage 22 from the portable feed carrier 1. The user may also remove the pail 21, which in turn allows the integral hanger attachment 9, 11 to slide out of the hanger strap guide 6, which then allows the flexible panel 2 to fully open.

Figure 9A:
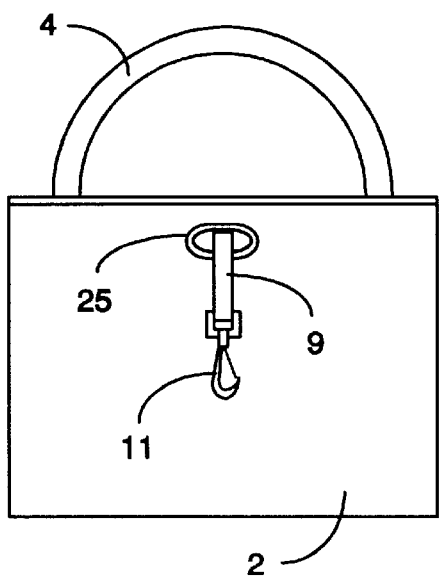
FIG. 9A is a front view of the portable feed carrier which shows the portable feed carrier in the partially closed position. The integral hanger is shown extending through an aperture in the side of the flexible panel.

FIG. 9A illustrates a front view of an alternative preferred embodiment in which the integral hanger attachment 9, 11 is inserted through a hanger grommet 25 rather than over the distal end of the flexible panel 2. The advantage of using a hanger grommet 25 is that it can be constructed of durable material such as metal which results in improved wear characteristics. Those skilled in the art will recognize that the grommet 25 is only one way of forming an aperture in the flexible panel 2 and can be replaced with a simple button hole, etc. However, a grommet 25 may provide superior ornamental value in addition to superior wear characteristics.

Figure 9B:
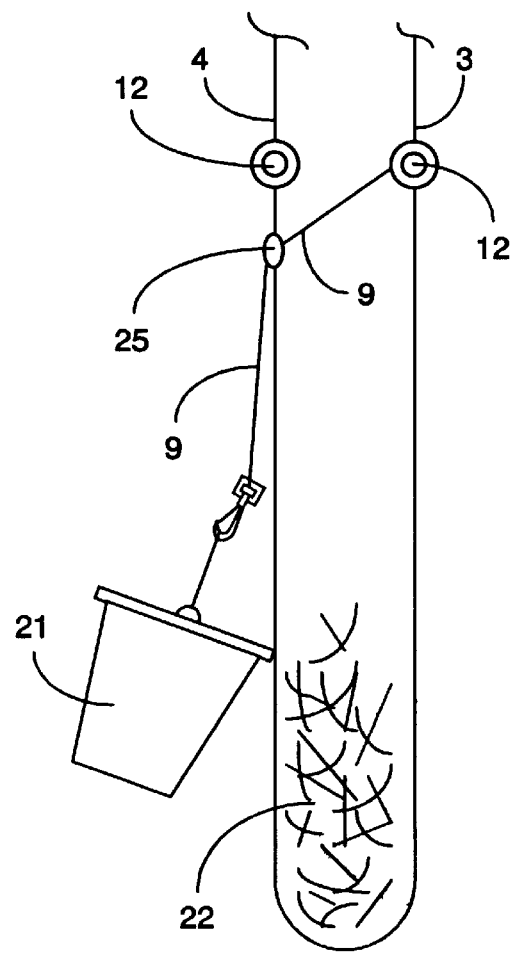
FIG. 9B is a side end view of the portable feed carrier which shows roughage in the central feed chamber and a pail containing grain attached to the integral hanger attachment which is inserted through a hanger grommet in the side of the flexible panel. The integral hanger attachment uses the weight of the pail to hold the portable feed carrier in a partially closed position.

FIG. 9B illustrates a side view of the embodiment of FIG. 9A. In this embodiment the distal end of the flexible panel 2 is pulled toward the proximal end of the flexible panel 2 to close the portable feed carrier 1 in the same manner as discussed in regard to the previous embodiments.

Figure 10:
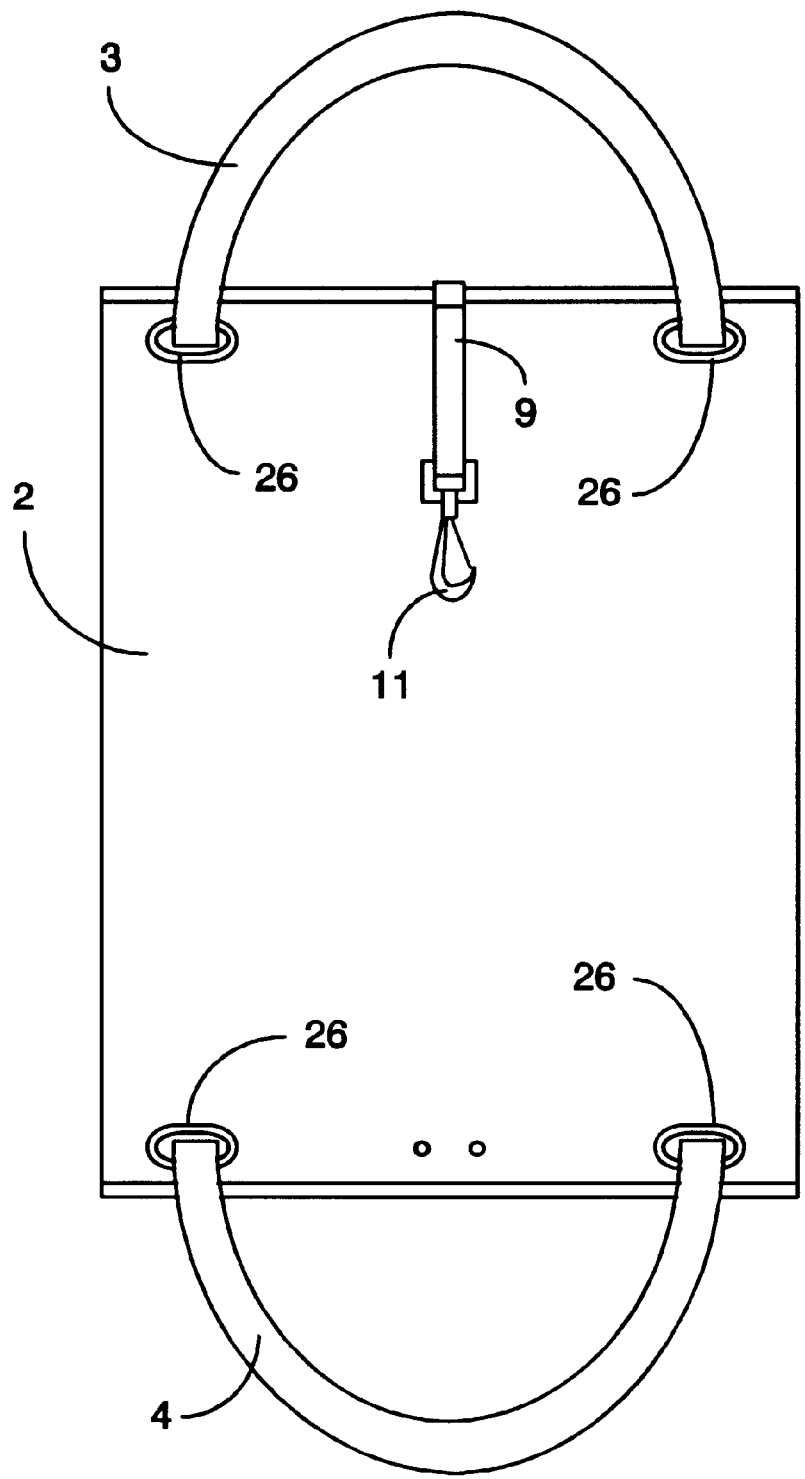
FIG. 10 is an alternative embodiment of the portable feed carrier in which the carrying straps are attached to the flexible panel by inserting them through apertures in the flexible panel.

In FIG. 10, another alternative embodiment is shown in which strap grommets 26 are used to attach carrying straps 3, 4. The carrying straps 3, 4 may be attached by any suitable means, such as inserting the end of the carrying straps 3, 4 through the grommets 26 and securing them by sewing, heat sealing, riveting, etc. Likewise, the straps 3, 4 may be attached directly to the grommets 26 or attached to themselves after insertion through the grommets 26. The grommets 26 may be located above or below the support rods 12 and can be one or more in number as well as any size suitable to attach carrying straps 3, 4.

Figure 11:
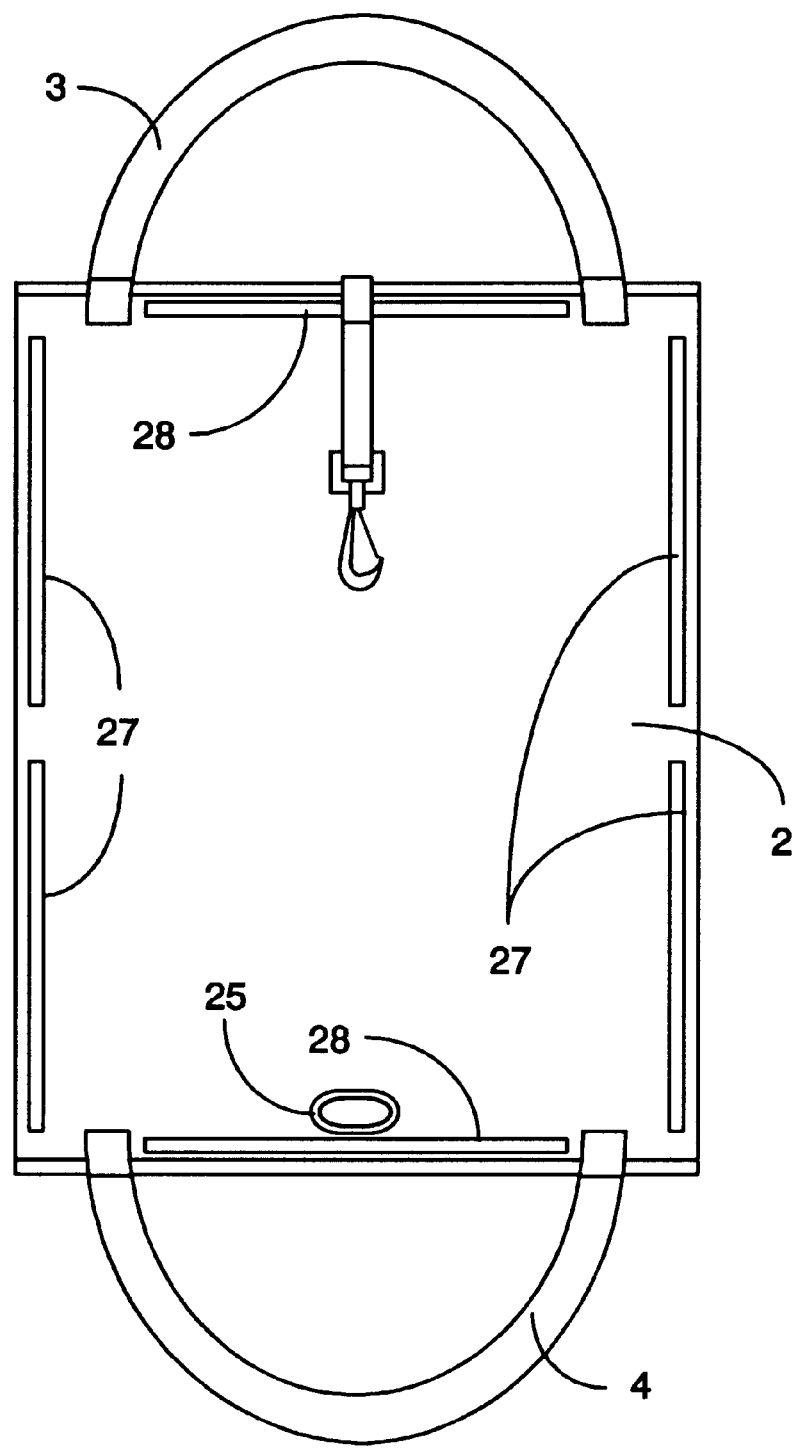
FIG. 11 is an alternative embodiment in which the flexible panel has strips of hook and loop material to seal the central feed chamber around its periphery.

FIG. 11 shows another alternative embodiment in which optional side sealing strips 27, and upper sealing strips 28 can be used to seal the edges of the flexible panel 2 when the portable feed carrier 1 is in the closed position. The preferred embodiment uses hook and loop material for side sealing strips 27 and upper sealing strips 28. However, those skilled in the art will recognize that side sealing strips 27, and upper sealing strips 28 can be implemented by a variety of alternative means. For example, zippers, fasteners, snaps, ties, etc. can also be used.

Figure 12A:
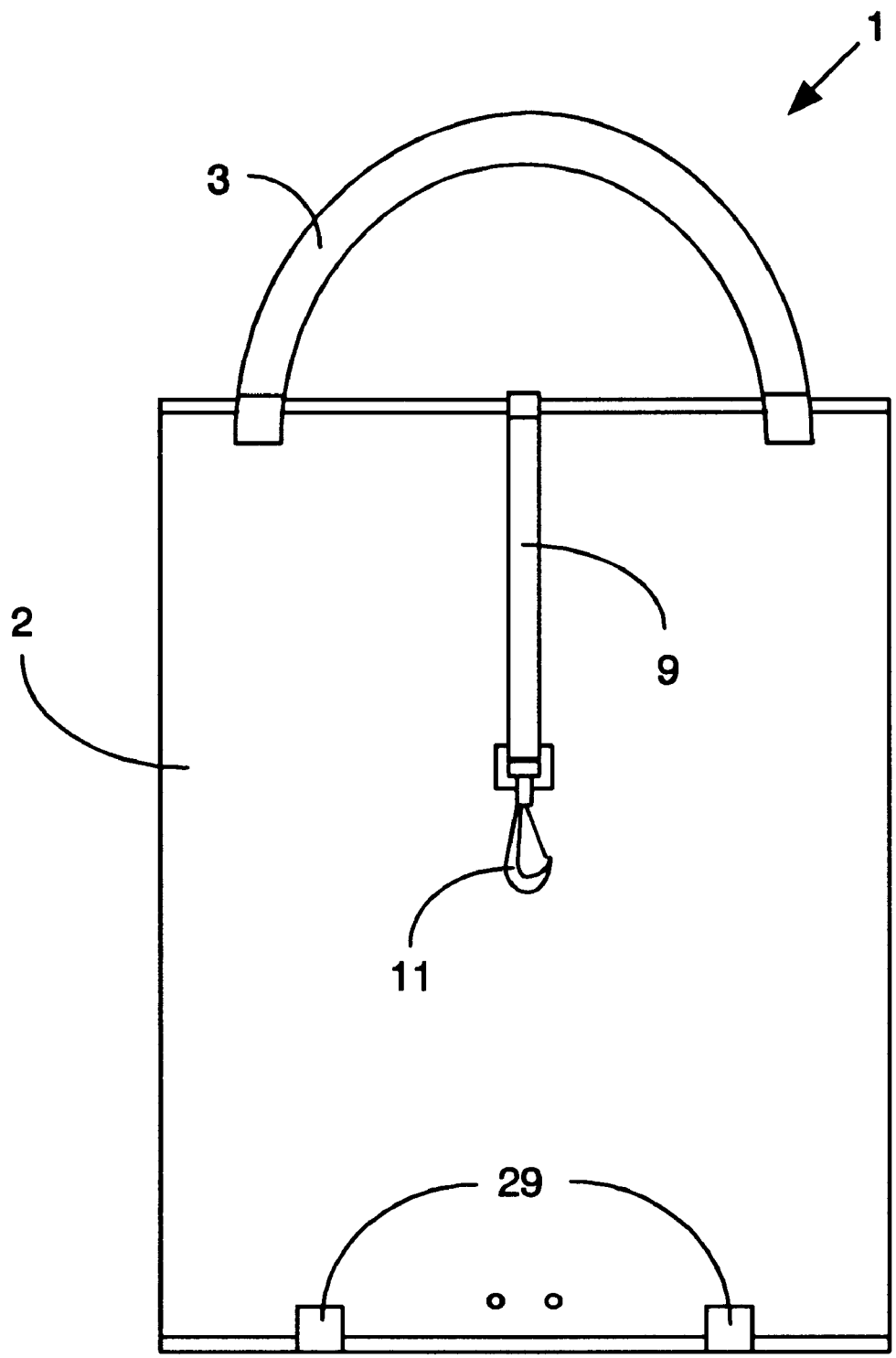
FIG. 12A is an alternative embodiment which use a single carrying strap and a securing attachment on the distal end of the portable feed carrier.

FIG. 12A is another alternative embodiment which only requires a single carrying strap 3. In this embodiment, distal closure attachments 29 are shown attached to the distal end of flexible panel 2. In this embodiment, the user would hang the portable feed carrier 1 from the user's shoulder via carrying strap 3 and secure it in the closed position by attaching distal closure attachments 29 to the proximal end of flexible panel 2.

Figure 12B:
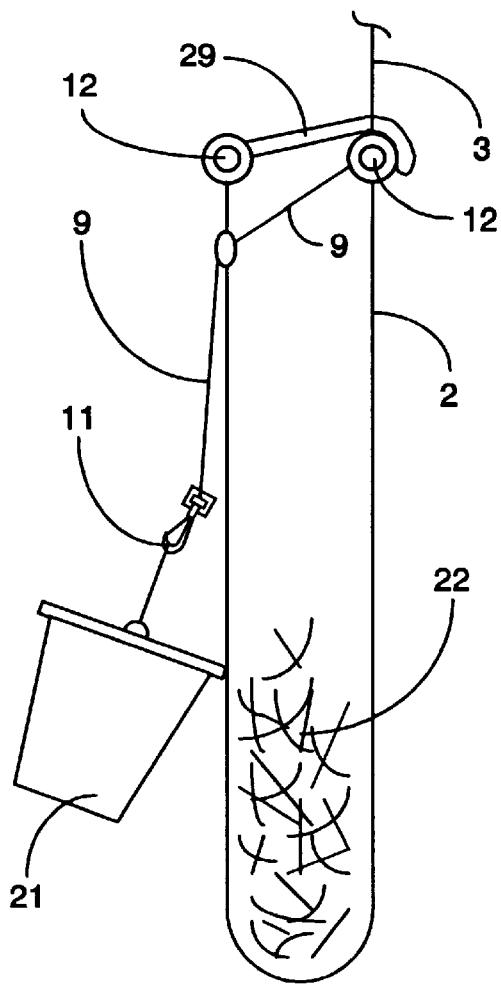
FIGS. 12B–12C are side views of the alternative embodiment of FIG. 12A in a partially closed and partially opened positions, respectively.

FIG. 12B is an end view of the embodiment of FIG. 12A and is shown with the distal closure attachments 29 securing the distal and proximal ends of flexible panel 2 together. For ease of illustration, distal closure attachments 29 are shown as rigid clamps. However, those skilled in the art will recognize that closure attachments 29 can be implemented in a variety of ways. For example, they can be implemented as hook and loop straps, as hooks, as snap-on connectors, etc. Two distal closure attachments 29 are shown in the figure, but a single closure attachment 29 or multiple closure attachments 29 can also be used. In addition, closure attachments 29 can be permanently or removably attached to flexible panel 2, and can be located at any suitable position on flexible panel 2.

Figure 12C:
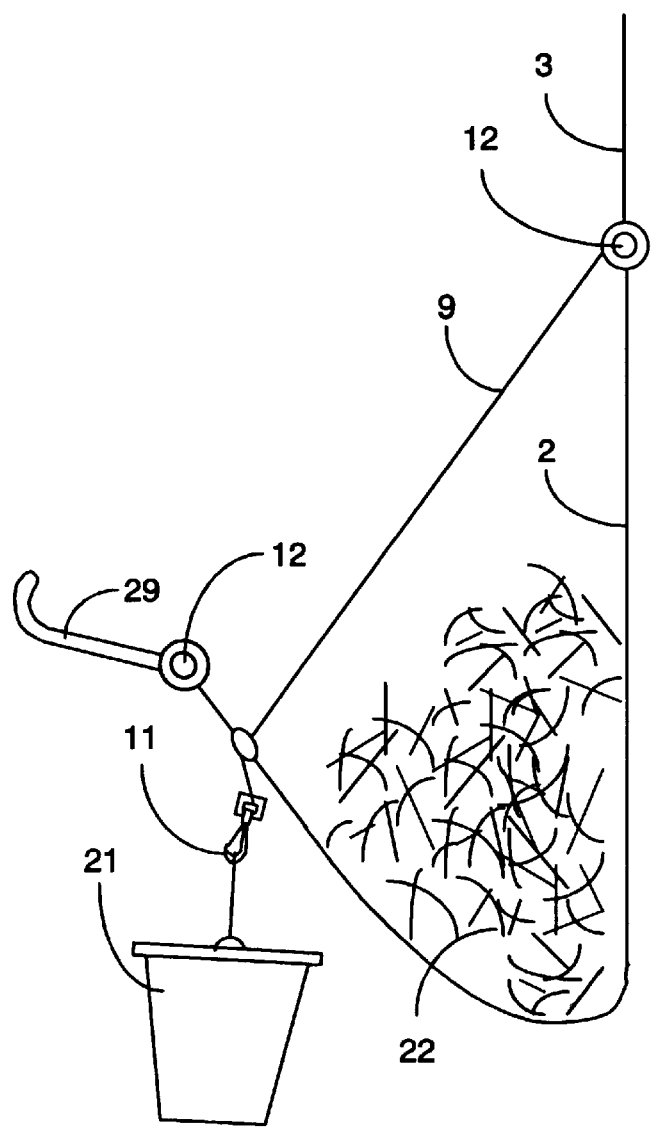

FIG. 12C illustrates the embodiment of FIG. 12A–12B in a partially opened position.

Figure 13:
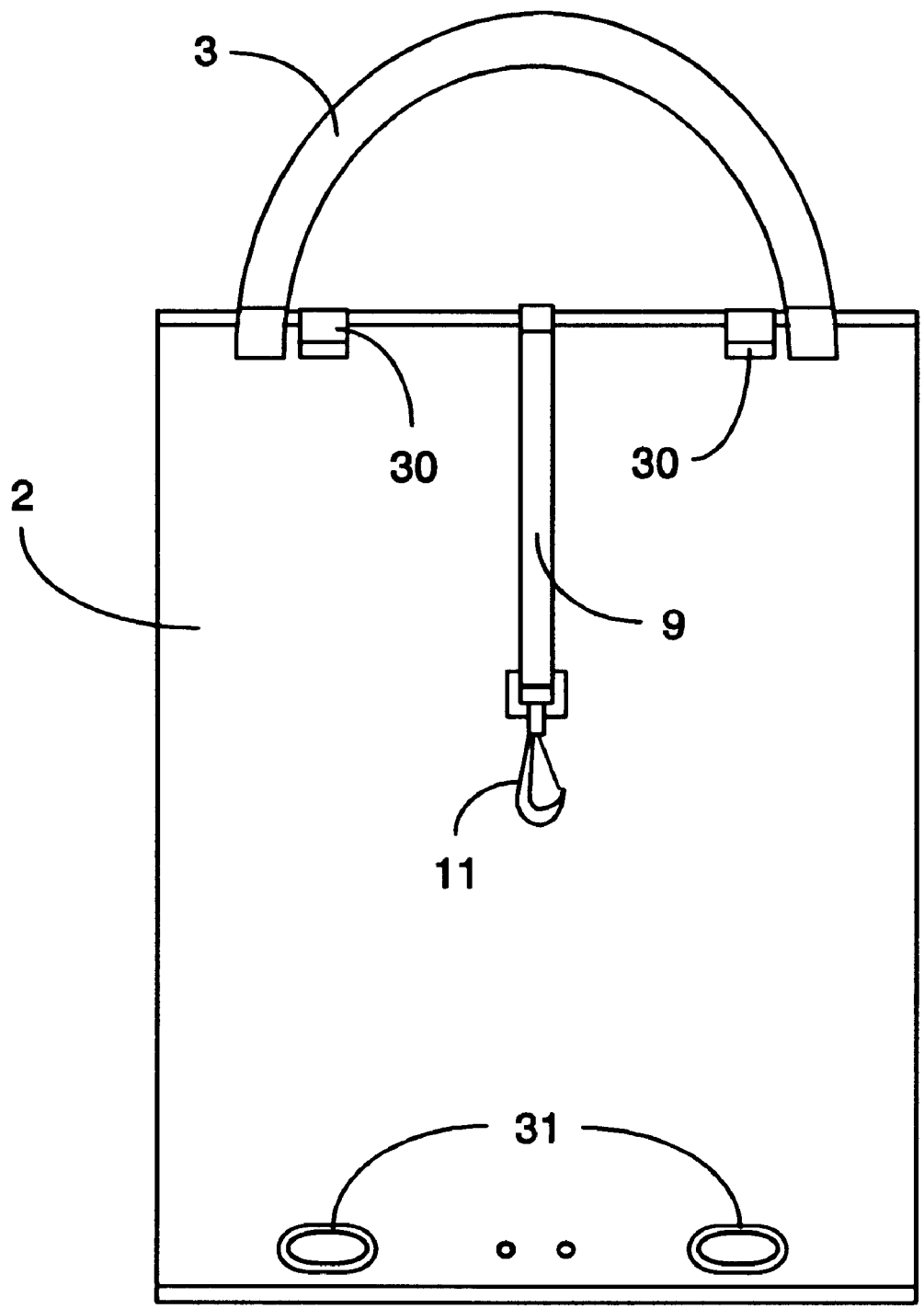
FIG. 13A is an alternative embodiment which use a single carrying strap and a securing attachment on the proximal end of the portable feed carrier.
FIGS. 13B–13C are side views of the alternative embodiment of FIG. 13A in the closed and open positions, respectively.

FIG. 13A is another alternative embodiment which only requires a single carrying strap 3. In this embodiment, proximal closure attachments 30 are shown attached to the proximal end of flexible panel 2. In this embodiment, the user would hang the portable feed carrier 1 from the user's shoulder via carrying strap 3 and secure it in the closed position by attaching proximal closure attachments 30 to the distal end of flexible panel 2. Closure grommets 31 are also shown. This embodiment uses closure grommets 31 as the means to secure the proximal and distal ends of flexible panel 2 in the closed position. The proximal closure attachments 30 are inserted through the closure grommets 31 and hold the distal end of flexible panel 2. As was the case in the previous embodiment, two proximal closure attachments 30 and two closure grommets 31 are shown, but only one is required, and closure attachments 30 can be permanently or removably attached to flexible panel 2, and can be located at any suitable location.

Figure 13B:
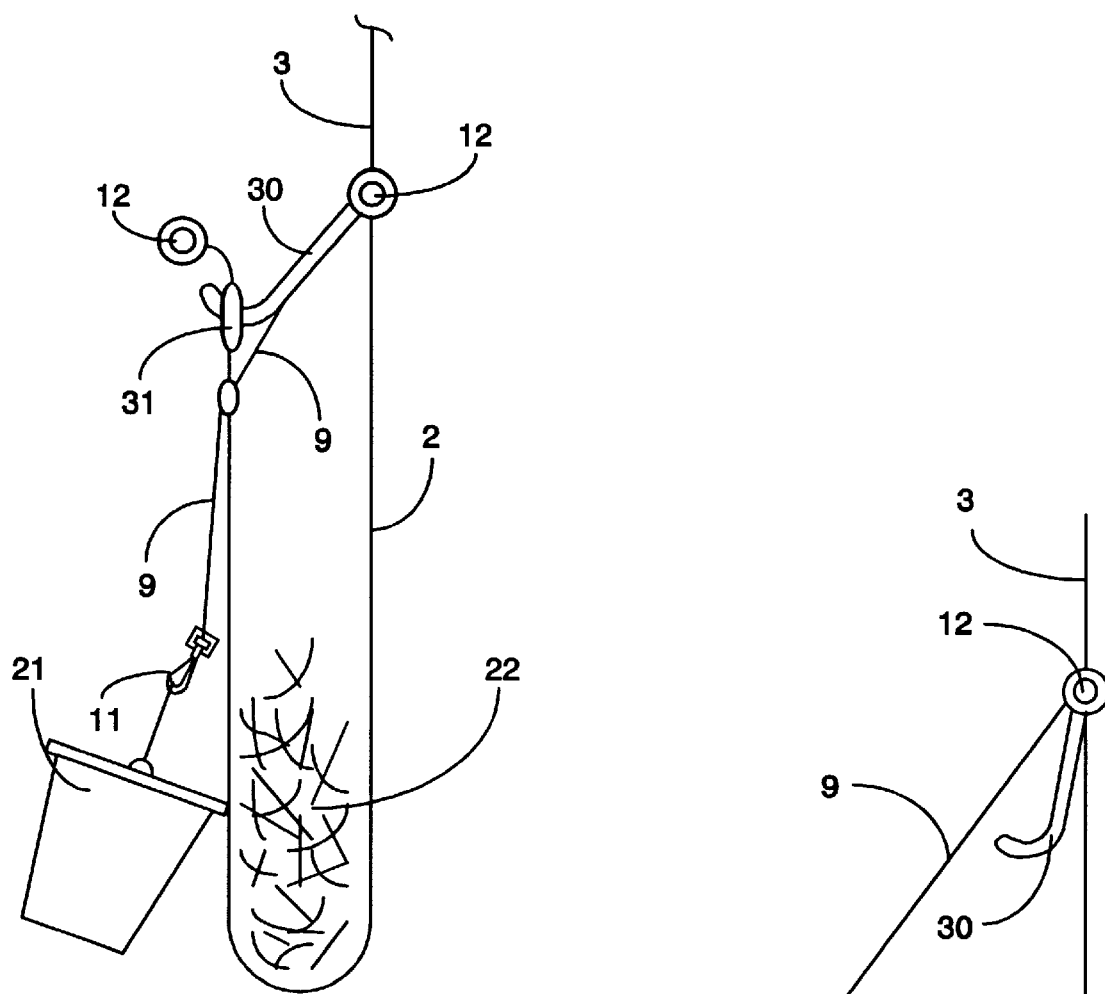

FIG. 13B is an end view of the embodiment of FIG. 13A in a partially closed position and is shown with the proximal closure attachments 30 securing the distal and proximal ends of flexible panel 2 together. As was the case above, proximal closure attachments 30 can be implemented in a variety of ways such as hook and loop straps, as hooks, as snap-on connectors, etc., and can be located at any suitable location.

Figure 13C:
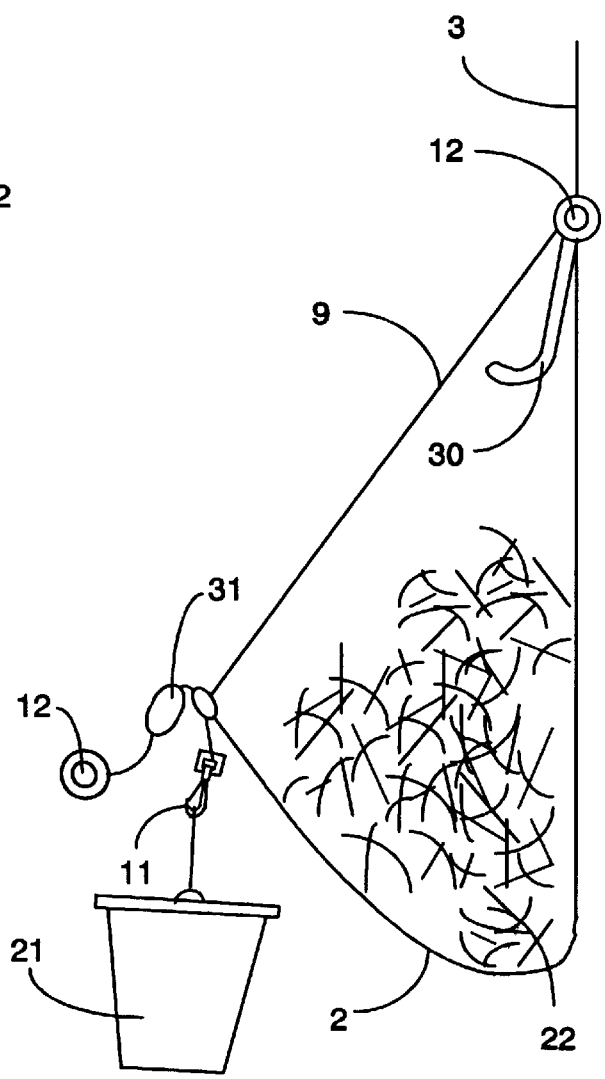

FIG. 13C illustrates the embodiment of FIG. 13A–13B in a partially opened position.

Figure 14:
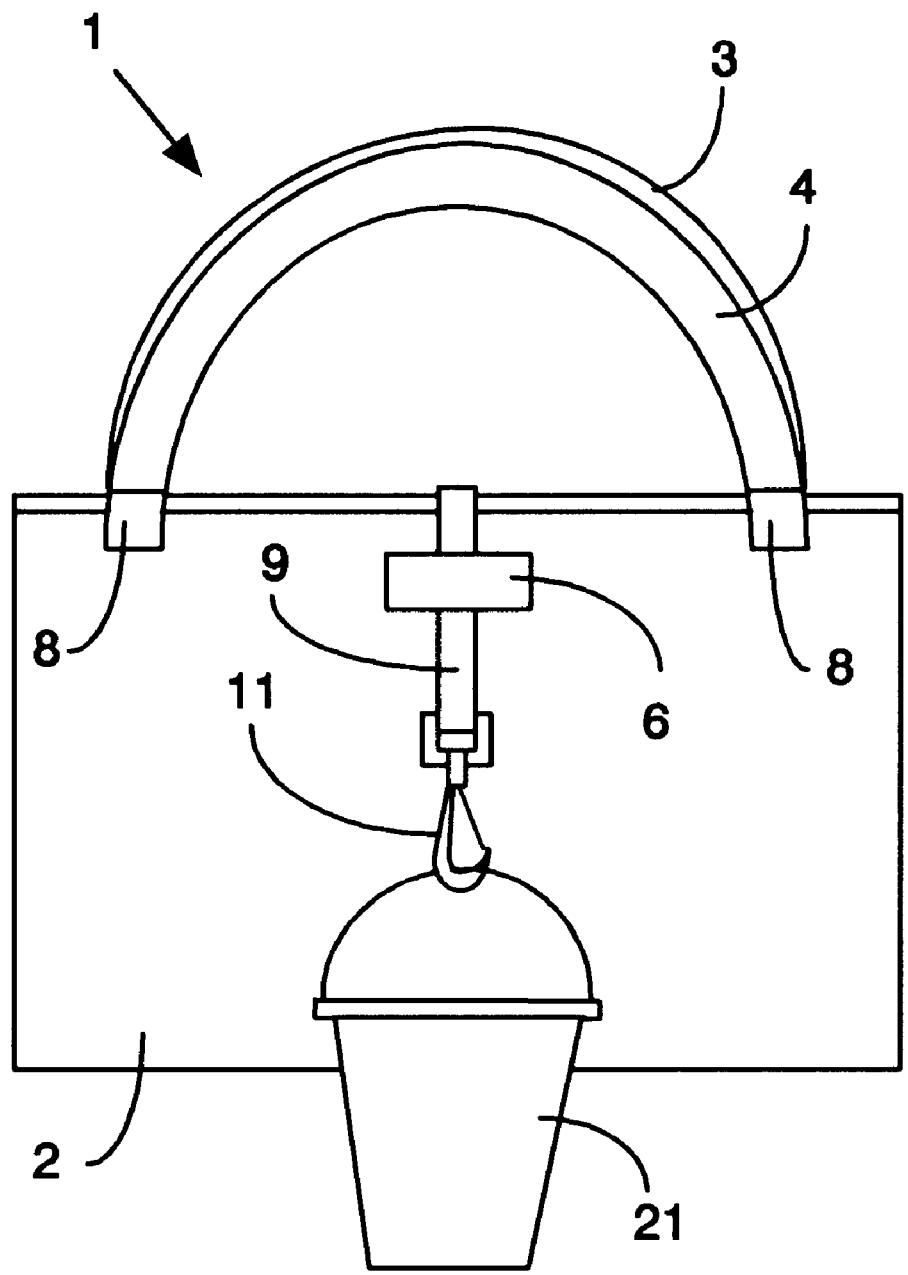
FIG. 14 is a preferred embodiment showing a frontal view of the outside surface of the portable feed carrier in the partially closed position.

In FIG. 14 a front view of a preferred embodiment of the portable feed carrier 1. In this view, the portable feed carrier 1 is in the closed position. Hanger strap guide 6 centers the hanger strap 9 thereby adding stability and balance to the closed position. As can be seen, hanger strap 9 is pulled down by the weight of pail 21. Since hanger strap 9 is attached to the proximal end of flexible panel 2 or to proximal carrying strap 3 (, it extends over the top of the distal end of flexible panel 2 and acts to hold it in the closed position.

Figure 15:
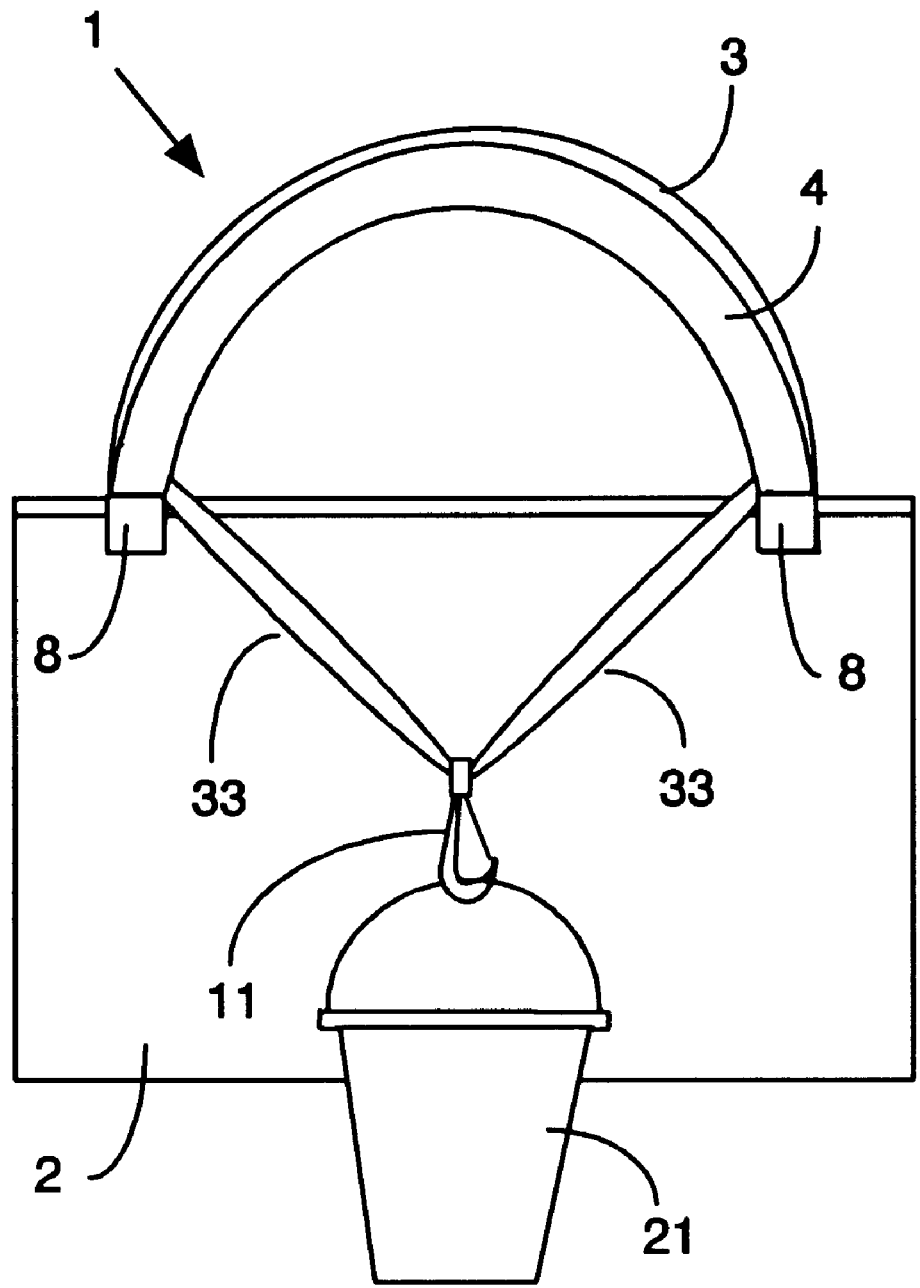
FIG. 15 is an alternative preferred embodiment showing a frontal view of the outside surface of the portable feed carrier in the partially closed position with the pail held by straps extending from the shoulder straps.

In FIG. 15 a front view of an alternative preferred embodiment of the portable feed carrier 1. In this view, the portable feed carrier 1 is also in the closed position. Hanger strap guide 6 is deleted in this embodiment. Side hanger strap 33 attached to the proximal carrying strap 3 and acts to center the pail 21 when the portable feed carrier 1 is in the closed position. The hanger strap 33 may optionally be attached to the flexible panel 2 rather than the proximal carrying strap 3.

Figure 16:
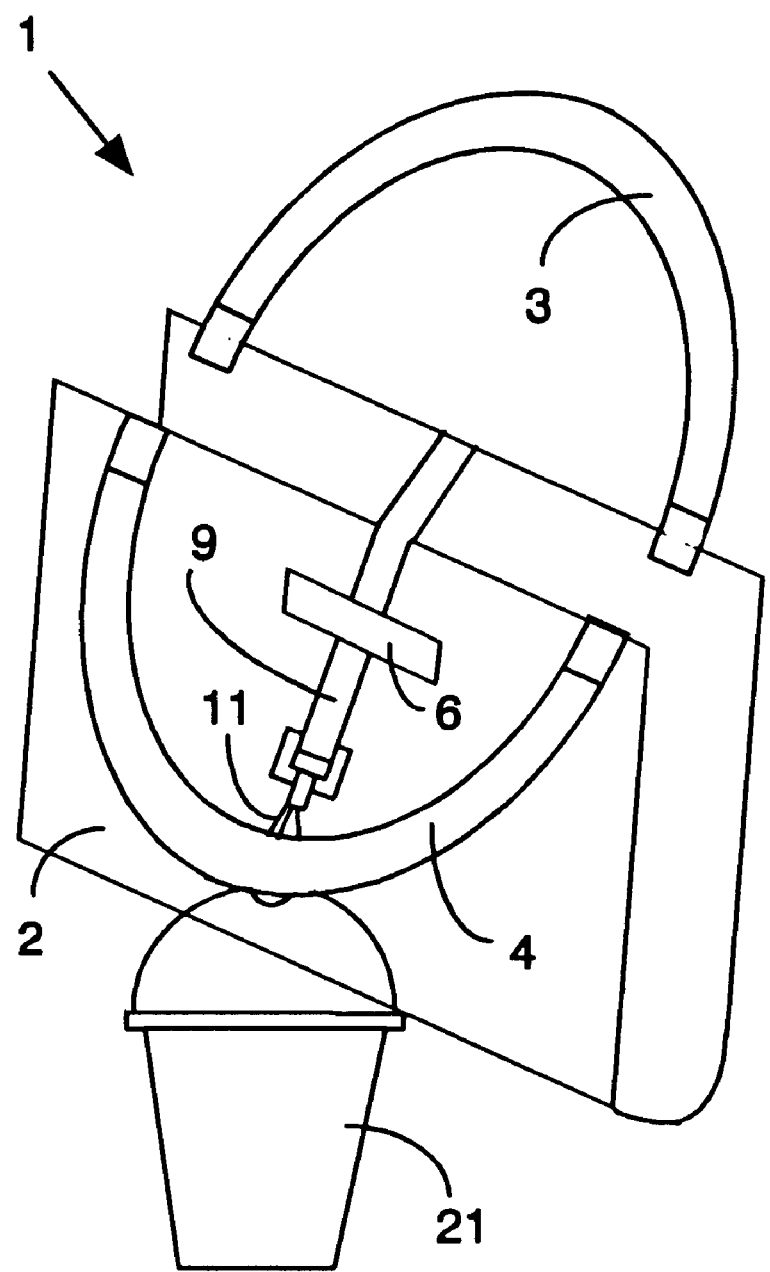
FIG. 16 is a front perspective view of a preferred embodiment illustrating the portable feed carrier with the grain carrying pail pulling it toward the closed position.

FIG. 16 is a front perspective view illustrating the portable feed carrier 1 with the grain carrying pail 21 pulling it to the closed position. The carrying strap 4 is shown lowered for ease of illustration.

While the invention has been described with respect to a preferred embodiment thereof, it will be understood by those skilled in the art that various changes in detail may be made therein without departing from the spirit, scope, and teaching of the invention. For example, the material used to construct the portable feed carrier may be anything suitable for the conditions in which it will be used, the size and shape can vary. The type of closure means or support rods can vary, etc. Accordingly, the invention herein disclosed is to be limited only as specified in the following claims.

I claim:

1. A portable feed carrier for separately carrying roughage and grain, comprising:

roughage carrying means, the roughage carrying means further comprising a flexible panel having a distal end and a proximal end, the flexible panel further being foldable to a closed position such that when the proximal and distal ends are substantially adjacent to one another, the flexible panel forms a central feed chamber suitable for carrying roughage and which is partially enclosed such that both sides are open, and the flexible panel further being foldable to an open position such that when the proximal and distal ends are separated from one another, the central feed chamber is accessible;

a first carrying strap attached approximately to the distal end of the flexible panel;

a second carrying strap attached approximately to the proximal end of the flexible panel; and pail attachment means attached to the flexible panel, the pail attachment means having a length suitable to extend outside of the central feed chamber when the flexible panel is in the closed position, and further having means to attach to a pail for carrying grain;

whereby the roughage carrying means and the pail attachment means allow roughage and grain to be simultaneously and separately carried.

2. A portable feed carrier for carrying roughage and grain, comprising:
- a flexible panel having a distal end and a proximal end, the flexible panel further being foldable to a closed position such that when the proximal and distal ends are substantially adjacent to one another, the flexible panel forms a central feed chamber which is partially enclosed, and the flexible panel further being foldable to an open position such that when the proximal and distal ends are separated from one another, the central feed chamber is accessible;
- a first carrying strap attached approximately to the distal end of the flexible panel;
- a second carrying strap attached approximately to the proximal end of the flexible panel;
- pail attachment means attached to the flexible panel, the pail attachment means having a length suitable to extend outside of the central feed chamber when the flexible panel is in the closed position;
- a strap guide is attached to the flexible panel near the distal end of the flexible panel;
- the pail attachment means further comprises:
  - a hanger strap; and
  - a fastener; and
- the strap guide sized to slidably retain the pail attachment means when the pail attachment means is inserted through the strap guide.

3. A portable feed carrier, as in claim 2, further comprising:
- a pail, detachably attached to the fastener, the weight of the pail pulling on the pail attachment means such that the distal end the flexible panel is urged toward the proximal end of the flexible panel;
- whereby the weight of the pail automatically pulls the flexible panel to the closed position.

4. A portable feed carrier, as in claim 3, wherein:
- the flexible panel further comprises:
  - a distal sleeve formed near the distal end of the flexible panel and a proximal sleeve formed near the proximal end of the flexible panel;
- a distal support rod inserted in the distal sleeve;
- a proximal support rod inserted in the proximal sleeve;
- whereby the support rods reinforce the flexible panel at the distal and proximal ends.

5. A portable feed carrier, as in claim 4, wherein:
- the proximal support rod having at least a first and second rigid segments, each of the rigid segments separable from one another;
- means to secure the rigid segments of the proximal support rod to one another such that they form a single support rod;
- the distal support rod having at least a first and second rigid segments, each of the rigid segments separable from one another;
- means to secure the rigid segments of the distal support rod to one another such that they form a single support rod;
- whereby the support rods can be disassembled for storage.

6. A portable feed carrier, as in claim 5, wherein the support rods have pliant end caps secured to each end.

7. A portable feed carrier, as in claim 2, further comprising:
- hook and loop edge seals attached to the surface of the flexible panel such that the edges of the flexible panel may be substantially sealed when the flexible panel is in the closed position.

8. A portable feed carrier for carrying roughage and grain, comprising:
- a flexible panel having a distal end and a proximal end, the flexible panel further being foldable to a closed position such that when the proximal and distal ends are substantially adjacent to one another, the flexible panel forms a central feed chamber which is partially enclosed, and the flexible panel further being foldable to an open position such that when the proximal and distal ends are separated from one another, the central feed chamber is accessible;
- a carrying strap attached to the proximal end of the flexible panel;
- a strap guide is attached to the flexible panel near the distal end of the flexible panel;
- pail attachment means attached to the flexible panel, the pail attachment means having a length suitable to extend outside of the central feed chamber when the flexible panel is in the closed position, the pail attachment means further having a hanger strap and a fastener;
- the strap guide sized to slidably retain the pail attachment means when the pail attachment means is inserted through the strap guide.

9. A portable feed carrier, as in claim 8, wherein:
- an aperture in the flexible panel near the distal end of the flexible panel;
- the pail attachment means further comprises:
  - a hanger strap; and
  - a fastener;
- the aperture sized to slidably retain the pail attachment means when the pail attachment means is inserted through the aperture.

10. A portable feed carrier, as in claim 8, wherein:
- a proximal support rod having at least a first and second rigid segments, each of the rigid segments separable from one another;
- means to secure the rigid segments of the proximal support rod to one another such that they form a single support rod;
- a distal support rod having at least a first and second rigid segments, each of the rigid segments separable from one another;
- means to secure the rigid segments of the distal support rod to one another such that they form a single support rod;
- whereby the support rods can be disassembled for storage.

11. A portable feed carrier, as in claim 10, wherein the support rods have pliant end caps secured to each end.

12. A portable feed carrier, as in claim 8, further comprising:
- at least one distal retainer, the distal retainer attached to the distal end of the flexible panel and detachably attached to the proximal end of the flexible panel;
- whereby the distal retainer can secure the proximal and distal ends of the flexible panel together.

13. A portable feed carrier, as in claim 8, further comprising:
- at least one proximal retainer, the proximal retainer attached to the distal end of the flexible panel and detachably attached to the proximal end of the flexible panel;
- whereby the proximal retainer can secure the proximal and distal ends of the flexible panel together.

* * * * *